July 27, 1965
L. D. MORRIS ETAL
3,197,611
ELECTRODE WIRE GUIDE ATTACHMENT AND GAS BLANKET
CONDUIT FOR A WELDING GUN
Filed Dec. 3, 1962
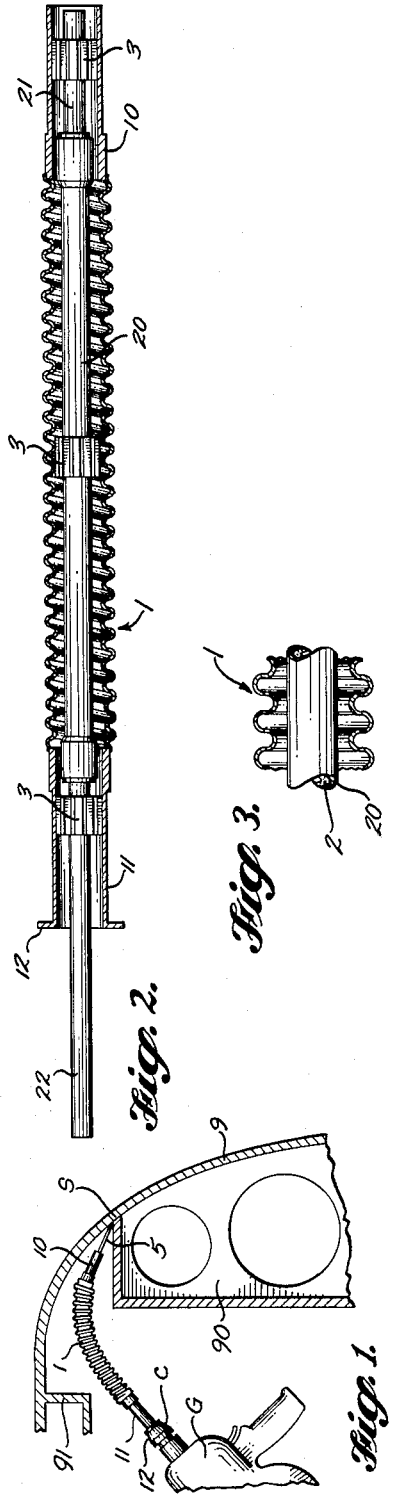
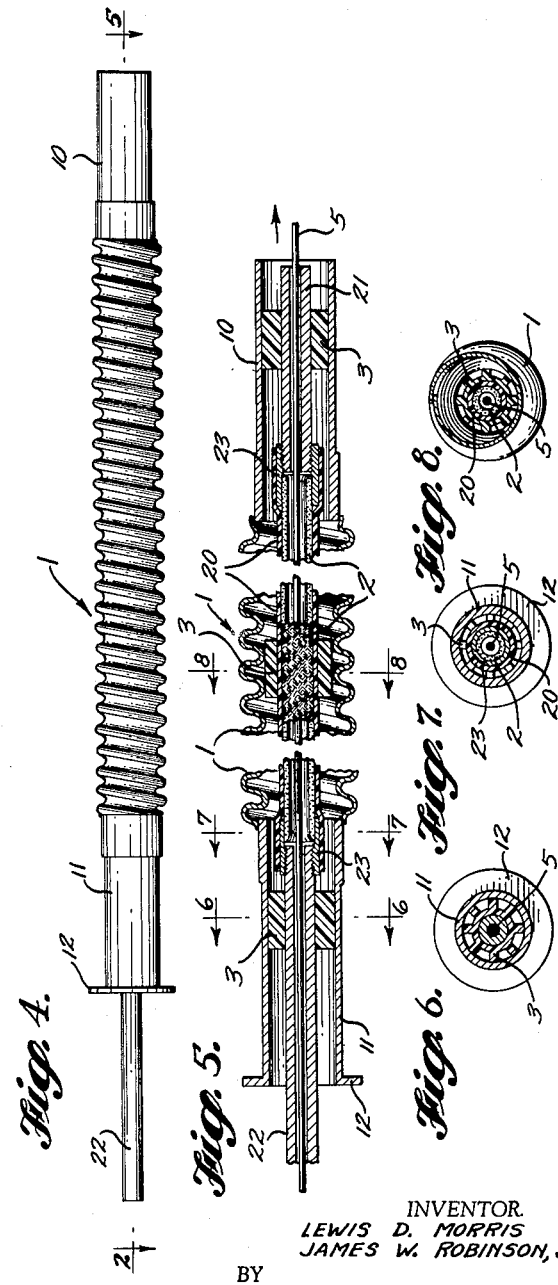
INVENTOR.
LEWIS D. MORRIS
JAMES W. ROBINSON, JR.
BY
*Reynolds & Christensen*
ATTORNEYS

United States Patent Office 3,197,611
Patented July 27, 1965

3,197,611
ELECTRODE WIRE GUIDE ATTACHMENT AND GAS BLANKET CONDUIT FOR A WELDING GUN
Lewis D. Morris, 2518 E. 16th St., and James W. Robinson, Jr., 143 Lebo Blvd., both of Bremerton, Wash.
Filed Dec. 3, 1962, Ser. No. 241,931
9 Claims. (Cl. 219—130)

This invention relates to welding gun extensions for continuous-feed, gas-blanketed electric arc welding, in which a consumable wire electrode stored on a spool is fed to the welding zone through the gaseous discharge from the welding gun nozzle. More specifically, the present invention concerns an elongated electrode guide and gas nozzle unit which can be used with or become part of such welding guns and can be bent into any of various configurations in order to reach work areas which otherwise are inaccessible to the guns.

Extension units of this general nature have been known heretofore. However, there have been difficulties with prior units, particularly with the problem of minimizing electrode friction while attaining other necessary structural and functional characteristics such as insulating the welding wire from grounded metal parts, providing a clear passage for gas flow through a unit which is easily bent into any of various configurations and which will remain in any given setting, and providing such a unit which will withstand repeated flexure without damage.

The broad object of the present invention is to overcome these difficulties and to devise a practicable and economically feasible unit which may be either in the form of an attachment to existing guns or embodied integrally in welding guns.

A further object of this invention is to provide such an attachment in a form that is quickly and easily applied to and removed from a standard commercially available welding gun.

It is also an object to make the bendable guide mainly of elements which are readily available or easily produced and thereby keep the cost of the attachment low.

A specific object is to provide an elongated bendable welding gun extension unit imposing negligible frictional drag on the electrode wire even in rather sharply bent configurations, yet which provides the necessary electrode wire guidance and gas delivery functions required in continuous-feed gas-blanketing welding guns.

The invention is shown in alternately usable forms, which will be described hereinafter, and the principles which distinguish the invention will be set forth in the claims.

FIGURE 1 is an elevational view, showing a welding gun with this attachment applied to it, in a welding operation involving a seam which except for the attachment would be inaccessible; the workpiece is shown in section.

FIGURE 2 is an axial sectional view through the outer guide element of the attachment, in unbent position, and in a presently preferred mechanical form.

FIGURE 3 is a similar view, of a short section only, showing a modified form of the outer guide element.

FIGURE 4 is a side view of the form of the attachment shown in FIGURE 2, and FIGURE 5 is an enlarged axial sectional view of the same.

FIGURES 6, 7 and 8 are transverse sectional views at the respective lines 6—6, 7—7 and 8—8 of FIGURE 5.

The workpiece shown might be a ship or structure, including a stiffener 90 which must be welded to a curved plate 9 along a seam at S, but access to the seam is blocked by the curvature of the plate and by other structure 91 that is integral with the plate. The welding gun G, which is representative of a commercially available gun, has a short, straight nozzle which cannot feed the welding wire to the seam at S, about a curve.

The attachment includes an outer guide element or casing 1 which is of a material, and in a form, such that it is inherently bendable, so that it may be easily bent about any desired curve, and when so bent will retain its set. It could be of plastic material, but in the preferred form this casing 1 is formed by spirally corrugating a tube of a material such as a high-copper brass which may be bent repeatedly without great effort, yet will hold a set against the forces of normal use. Being used in large quantity for encasing such conduit, it is readily and inexpensively available. At its ends ferrules 10 and 11 are attached to it, the latter ferrule having a flange 12. It will be recognized that such a casing as 1 can be readily bent to any desired curvature, and as its successive turns are in close frictional contact with each other it resists any internal tendency to straighten out, and will retain the set given to it. The alternate form, shown in FIGURE 3, is also corrugated in bellows-like form and of a malleable material such as brass, but in this case the corrugations are of nonspiral form.

Inside the casing 1, and spaced at all points from contact with its walls, is the welding wire guide sleeve 2. This is of an electrically conductive material having a low coefficient of friction with the welding wire material (usually aluminum) and capable of guiding such wire 5 around bends without wearing unduly where it is contacted by the welding wire. At the same time this guide sleeve must have a very high degree of pliability so that it will not add materially to the straightening forces which must be resisted by the casing in order to maintain a given set in the unit. A braided copper or malleable copper alloy sleeve is found to be ideally suited for use here. At its ends it communicates with the interior of rigid metal sleeves 21 and 22, as by the couplings 23—see FIGURE 5. The sleeve 22 contacts a conductor (not shown) of welding current within the gun G, the nozzle whereof it enters and is held in place by the chuck C. The stop flange 12 limits inward movement of the sleeve 22. Welding current flows by way of rigid guide sleeve 22, flexible guide sleeve 2, rigid sleeve 21 and, of course, the electrode wire 5 itself.

The conductive flexible sleeve 2 must be electrically insulated from the outer casing 1 if the latter is metal. To this end the sleeve 2 is encased within a flexible insulative coating or skin 20, which may also enclose the couplings 23. To keep the sleeve 2 centered within the outer casing 1, no matter how sharply the attachment may be bent within its operating limits, as also the sleeves 21 and 22 within the ferrules 10 and 11, spiders or interrupted spacer collars 3 are employed at intervals lengthwise of the attachment, as many as are required being used. Preferably these are of insulative material, as for instance Teflon or a ceramic material and they should be reasonably resistant to deterioration from heat, for the attachment, or at least the interior portions thereof, will become heated to some extent during use.

Since inert blanketing gas is used with such guns, discharging from the gun's nozzle at which the electrode wire emerges, the outer casing 1 defines a continuing conduit for the flow of gas, between itself and the inner conductive sleeve 2. The spacer collars 3 are apertured or in the form of spiders, as is clearly shown in FIGURES 7, 8 and 9, and pass the cooling gas to the attachment ferrule or nozzle at 10, whence it issues in the direction of the point of welding, at S. Controls for the gas, as for the welding current, are incorporated in or associated with the gun. This gas flow serves the additional purpose of cooling the parts during welding operations.

Whenever a job requires welding a seam in an inaccesible spot, such as is illustrated in FIGURE 1, the welding wire 5 is inserted within the sleeve at 22, and is pushed through the flexible sleeve 2 and out at the ferrule 10. The sleeve 22 is chucked and held in the nozzle of the gun G, which grounds the outer casing 1 to the gun, and all is in readiness for adjustment and use. The outer casing 1 is bent to a convenient curvature, even a complex curvature, and remains thus bent until it is later bent straight or to a different curvature. As it bends it also bends the flexible inner sleeve or wire guide 2. The spacers 3 hold the latter generally centered within the outer casing 1. Now the gun G is controlled in the usual way and by the normal controls, the tip of wire 5 is applied to and moved along the seam S, and the weld is accomplished as the wire 5 feeds out by the motor within the gun. Cooling is also effected by the passage of inert cooling gas through outer casing 1 and out at 10 toward the point of welding, blanketing that point. If additional cooling is desired a water-jacketed tip could be employed at 10.

These and other aspects of the invention achieving the objectives set forth above are apparent in the illustrated unit depicted in the drawings but may be embodied in modified or varient forms without departing from the essential features of the inventive concepts as defined in the claims.

I claim as my invention:

1. An electrode guide attachment for welding guns, for the purpose specified, comprising an outer casing formed as a series of continuous convolutions in bellows-like form, and inherently bendable and settable in a bent form, a sleeve extending from one end of said outer casing for engagement with the nozzle of a welding gun, to conduct gas from the gun to the interior of said outer casing, a freely flexible inner sleeve of braided conductive wires disposed substantially coaxially within said outer casing to form a passageway for flow of gas through the attachment, spacers apertured for passage of gas, and disposed at intervals lengthwise of said outer casing and inner sleve, to retain the latter spaced from and substantially centralized within the outer casing, in all bent positions thereof, a rigid extension sleeve at the nozzle-connecting end of the attachment, for securement to the nozzle of the gun, and communicating with the interior of the inner sleeve, for guiding to the latter electrode wire from the gun, to be guided in bent configuration therethrough by contact with the inner sleeve, means at the opposite end of the inner sleeve and held within the outer casing for guiding such wire to the work, and means at such opposite end of the outer casing for directing gas about the issuing electrode wire toward its work-contacting tip.

2. A combined gas conduit and electrode guide attachment for gas-blanketing, continuous-feed wire electrode welding guns, comprising an elongated inherently flexible tubular outer casing which is capable of being bent by hand into and of retaining different curved configurations, and adapted at one end for connection to the nozzle of such a welding gun, to receive blanketing gas and electrode wire from the gun, an inner guide sleeve for the electrode wire which is mounted within the outer casing in radially inwardly spaced lengthwise relation thereto so as to define a feed passage through the casing for the blanketing gas, and characterized with an axial bore which has a cross section that is adapted throughout its length to pass the wire unobstructively therethrough, and a body which has a freely flexible, electrically conductive construction that is responsive to bending of the outer casing to maintain the bore in substantially the same cross section so that it remains unobstructed to passage of the wire, means to maintain the inner guide sleeve electrically insulated from the outer casing, means at the nozzle-connected end of the outer casing for connecting the sleeve to a source of welding current at the gun, and means at the discharge end of the sleeve for guiding the issuing electrode wire to the work.

3. An attachment according to claim 2 wherein the body of the inner guide sleeve has a braided construction.

4. An attachment according to claim 3 wherein the body of the inner guide sleeve is constructed from braided conductive malleable metal wires.

5. An attachment according to claim 4 wherein the metal has a low coefficient of friction in relation to the wire electrode material feeding through the sleeve.

6. An electrode guide as in claim 2, wherein the insulating means comprises a flexible dielectric covering on the inner guide sleeve, and spacers disposed at intervals lengthwise of the attachment, interposed between the outer casing and the inner guide sleeve, said spacers being formed to maintain passages for flow of gas between the outer casing and inner guide sleeve.

7. An electrode guide as in claim 2, wherein the flexible outer casing is formed as a continuous series of helical convolutions of bellows-like form, of metal.

8. An electrode guide as in claim 2, wherein the flexible outer casing is formed as a plurality of circular convolutions of metal, arranged in bellows-like form.

9. The guide defined in claim 2, wherein the inner guide sleeve comprises a flexible braided sleeve of wires comprising copper.

References Cited by the Examiner

UNITED STATES PATENTS

| | | | |
|---|---|---|---|
| 2,360,743 | 10/44 | Tuttle | 314—129 X |
| 2,402,937 | 6/46 | Stringham | 219—130 |
| 2,555,017 | 5/51 | Tuthill | 219—75 |
| 2,727,970 | 12/55 | Turbett | 219—130 |
| 2,748,236 | 5/56 | Landis et al. | 219—130 |
| 2,817,749 | 12/57 | Flood et al. | 219—130 |

RICHARD M. WOOD, *Primary Examiner.*